(12) United States Patent
Barnett

(10) Patent No.: US 6,402,261 B1
(45) Date of Patent: Jun. 11, 2002

(54) CARGO TRAILER ANTI-THEFT SYSTEM

(75) Inventor: Burton Barnett, Rossmoor, CA (US)

(73) Assignee: Cargo Safe, Inc., Sun Valley, CA (US)

( * ) Notice: Subject to any disclaimer, the term of this patent is extended or adjusted under 35 U.S.C. 154(b) by 0 days.

(21) Appl. No.: 09/466,655

(22) Filed: Dec. 20, 1999

(51) Int. Cl.$^7$ ............................. F01B 7/00; B60T 17/16
(52) U.S. Cl. ..................... 303/89; 303/9.76; 188/170; 92/23; 60/399
(58) Field of Search ................ 303/89, 9.76, 71; 188/265, 170, 171, 173; 92/62, 63, 64, 23, 18; 60/399

(56) References Cited

U.S. PATENT DOCUMENTS

| | | | | |
|---|---|---|---|---|
| 3,597,016 A | * | 8/1971 | Gachot | 303/89 |
| 3,826,176 A | * | 7/1974 | Ike | 92/25 |
| 4,007,815 A | * | 2/1977 | Acre | 188/265 |
| 4,014,414 A | * | 3/1977 | Yamamoto et al. | 188/170 |
| 4,014,579 A | * | 3/1977 | Dubois | 303/3 |
| 4,268,093 A | * | 5/1981 | Muller | 303/89 |
| 4,273,388 A | * | 6/1981 | Muller | 303/89 |
| 4,354,536 A | * | 10/1982 | Moss | 141/383 |
| 4,589,704 A | * | 5/1986 | Graham | 303/6 M |
| 4,685,744 A | * | 8/1987 | Luce | 303/89 |
| RE32,885 E | * | 3/1989 | Graham | 303/9.76 |
| 4,873,824 A | * | 10/1989 | Cox | 60/545 |
| 5,402,866 A | * | 4/1995 | Naedler et al. | 188/265 |
| 6,076,385 A | * | 6/2000 | Pedroso et al. | 70/257 |

OTHER PUBLICATIONS

Statutory Invention Registration H117 to Graham Sep. 2, 1986.*
Statutory Invention Registration H748 to Graham Mar. 6, 1990.*

* cited by examiner

*Primary Examiner*—Christopher P. Schwartz
*Assistant Examiner*—Melody M. Burch
(74) *Attorney, Agent, or Firm*—Klein & Szekeres, LLP

(57) ABSTRACT

In a theft deterrent security device for trailers and like equipment having a dual chamber brake system that operates with compressed air an electro mechanical device, such as servomotor or a solenoid, is mounted within the interior of the dual chamber brake system housing in which an expanded high spring-rate spring biases and keeps a brake actuator in a locked "brakes on" position when there is no compressed air supplied to the system. The servo motor or solenoid is connected to members which in one position mechanically block movement of the brake actuator to prevent its normal operation even when there is compressed air available to the system and the high spring-rate spring is compressed. In a second position of the servo motor or solenoid the members do not block movement of the brake actuator and thereby allow normal operation of the brakes. The servo motor or solenoid is responsive to coded signals which control its position and which are normally available only to an authorized user. Alternatively, a remote controlled valve is included in the interior of the dual chamber brake system to block supply of compressed air to the chamber having the high spring-rate spring.

2 Claims, 17 Drawing Sheets

CARGO TRAILER ANTI-THEFT SYSTEM

BACKGROUND OF THE INVENTION

1. Field of the Invention

The present invention is in the field of electromechanical devices designed to provide anti-theft protection to cargo trailers and like equipment equipped with air brakes. More particularly, the present invention is directed to a device or system that prevents unauthorized release of the locked brake actuator rod of trailers, tractors and of like equipment that are equipped with a dual chamber air brake system.

2. Brief Description of the Prior Art

Cargo-trailers, tractors and like equipment are vulnerable to theft particularly when parked or stored in remote or unpopulated locations where audible alarms are ineffective. In case of trailers and like equipment that do not have their own motive power (engine), compressed air for operating the brake system is supplied through a conduit from the tractor or truck that pulls the trailer. Such trailers and like towed equipment, as well as many tractors and trucks, are equipped with a dual chamber brake system that operates in such manner that the brakes are locked when pressurized air is not available. In order to take such a trailer without authorization, that is to steal it, the thief typically hooks the trailer to the thief's tractor which then supplies pressurized air to the dual chamber brake system of the trailer. In other words, by hooking up the thief's tractor's or truck's air pressure conduit to the brake system of the trailer, the thief is able to pull the trailer with the brakes operating normally. To this date and to the best knowledge of the present inventor, the state-of-the-art has attempted to prevent or discourage the theft of cargo-trailers by providing devices that make it difficult for an unauthorized person to access the trailer's hitch or "fifth wheel", or by providing a keyed cover ("glad hand" cover) that prevents attachment of a pressurized air conduit to the pressurized air inlet of the dual chamber air brake system of the trailer. Experience has shown however, that a determined thief circumvents these devices relatively easily. Therefore, there is still a serious need in the art for a device or system that renders the dual chamber air brake system of a trailer (or of a tractor) inoperational for unauthorized users. The present invention provides such a system.

SUMMARY OF THE INVENTION

It is an object of the present invention to provide a secure and difficult to circumvent locking device for the brakes of a trailer, tractor or other vehicle equipped with dual chamber air brake system, which locking device can be released only by an authorized user.

It is another object of the present invention to provide the locking device that meets the above-noted objective, and which operates within the interior of the dual chamber air brake system, thereby making it more difficult and time consuming to disassemble or inactivate the locking device and make unauthorized use of the trailer, tractor or other vehicle equipped with the device.

The foregoing and other objects and advantages are attained by a device that has means mounted within the interior of the dual chamber brake system to prevent a brake actuator rod from being retracted into its non-braking operative position even when pressurized air is supplied to the dual chamber brake system. The means for preventing such retraction, that is the means for locking the actuator rod into its position where the brakes are fully engaged, are activated and deactivated to respectively lock or to permit normal operation of the dual chamber brake system by an electro mechanical device, such as a servo-motor, solenoid or the like which is actuated from the outside by the use of a coded signal that is likely to be transmitted only by an authorized user. Alternatively a valve is incorporated within the interior of the air inlet of the dual chamber brake system which in its locked position prevents pressurized air from being supplied to one of the dual chambers, thereby preventing the release or retraction of the brake actuator rod into its non-braking operative position, The valve is operated by an electro mechanical device, such as a servo-motor or solenoid and is responsive to a coded signal that is likely to be transmitted only by an authorized user.

The features of the present invention can be best understood together with further objects and advantages by reference to the following description, taken in connection with the accompanying drawings, wherein like numerals indicate like parts.

BRIEF DESCRIPTION OF THE DRAWINGS

FIG. 14 is a partial cross-sectional view taken on lines 14,14 of. FIG. 13.

DESCRIPTION OF THE PREFERRED EMBODIMENTS

Figure 1:
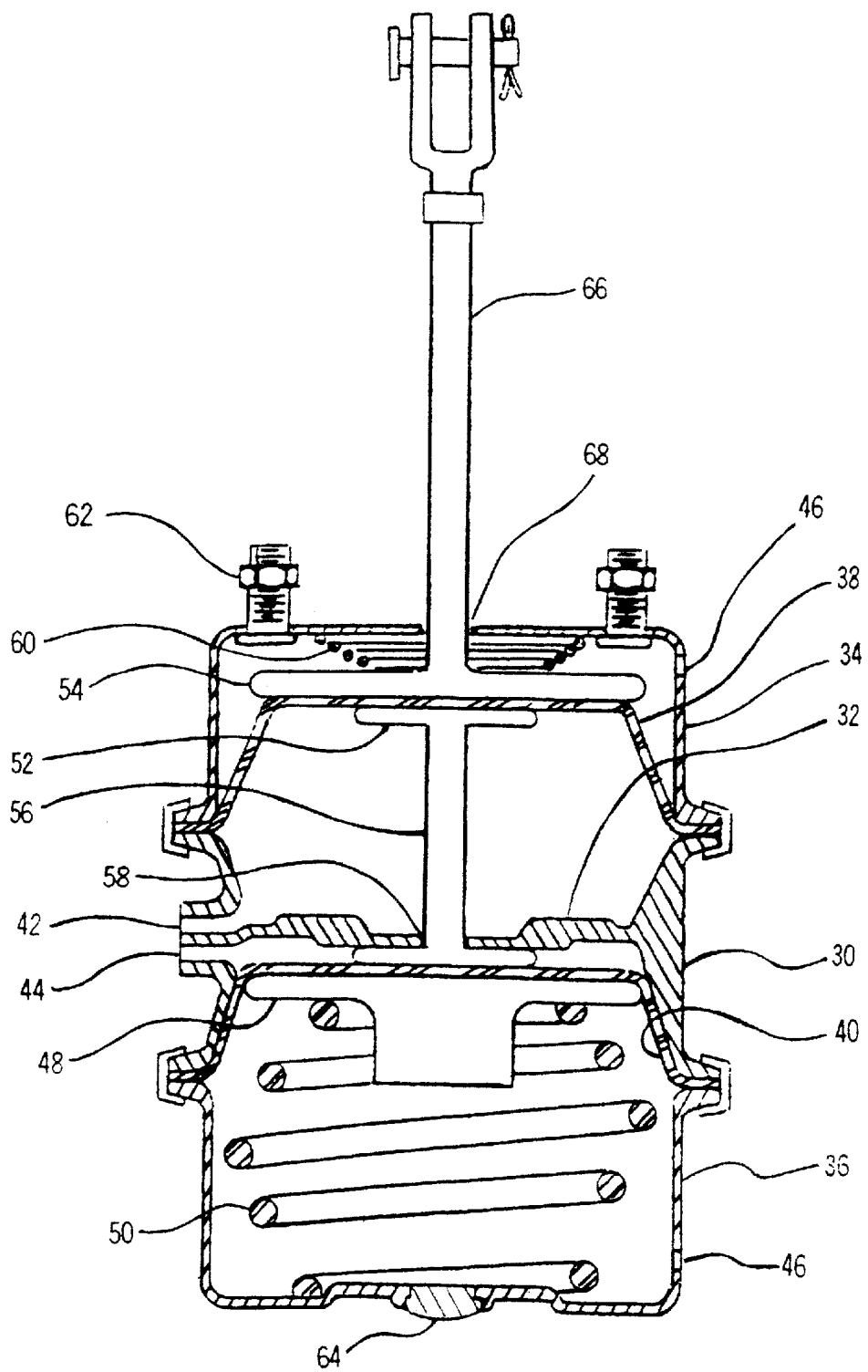
FIG. 1 is a sectional view of the dual chamber air brake system in accordance with the state-of-the-art, showing the air brakes in a locked position in a situation when pressurized air is not present in the system.

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

The present invention is best explained and understood in conjunction with a thorough understanding of the operation of the dual chamber air brake system that is constructed in accordance with the state-of-the-art. For this reason operation of the common state-of-the-art dual chamber air brake system is first explained with reference to FIGS. 1 through 4. The present invention is adapted to operate with such common dual chamber air brake system, with such modifications of the basic system that are required to incorporate into and integrate with it the security locking device of the invention.

Referring now to FIGS. 1 through 4, the state-of-the-art dual chamber brake system includes a housing 30 having two chambers with a common bulkhead 32. The first of the two chambers is the service housing chamber 34 and the second is the emergency housing chamber 36. Each of the two chambers 34 and 36 is divided into two parts by a flexible and stretchable diaphragm, termed the service diaphragm 38 and the emergency diaphragm 40, respectively. Each of the two chambers 34 and 36 has a separate inlet port for compressed air, that is there is a service chamber pressure port 42 and an emergency chamber pressure port 44. A line, conduit or hose (not shown) conducting compressed air can be attached to each port 42 and 44, and is actually attached when the brakes are dynamically operated, that is when the trailer (not shown), truck (not shown) or other vehicle (not shown) having the dual chamber brake system is moved. In the event the vehicle is a trailer (not shown) without its own supply of compressed air then the conduits (not shown) attached to the ports 42 and 44 supply compressed air provided by the truck (not shown) or other towing vehicle (not shown) which pulls the trailer (not shown). In this connection it should be understood that the present invention is primarily intended for trailers because these are the most vulnerable for theft, but that the present invention can also find application in any vehicle or equipment that has a dual chamber air brake system and which can be immobilized to prevent or hinder unauthorized removal.

Each of the two chambers 34 and 36 has a vent 46 that permits escape of air from the non-pressurized air space when the space behind the respective diaphragm 38 or 40 is pressurized with compressed air. The vented space in the emergency housing chamber 36 has a pressure plate 48 located between a high spring-rate (powerful) spring 50 and the diaphragm 40. A guide 52 links the movement of the pressure plate 48 in the emergency housing chamber 36 to the service diaphragm 38 in the service housing chamber 34 and to push a plate 54 that is located in the service housing chamber 34 between the service diaphragm 38 and the front wall of the service housing 34. The guide 52 includes a rod 56 that travels through an opening 58 in the common bulkhead 32. The rod 56 allows reciprocation of the guide 52 in the longitudinal direction relative to the two housings 34 and 36. A low spring-rate spring 60 is disposed between the push plate 54 and the front wall of the service housing 34. Two bolts 62 that attach the dual chamber brake system to the trailer (not shown), tractor (not shown) or other vehicle (not shown) are shown in the front of the housing 34, although more than two bolts may be used. A removable threaded cap 64 is located in the back wall of the emergency housing chamber 36. The purpose of the threaded cap 64 is to allow access with a special tool (not shown) into the interior of the emergency housing chamber 36. The low spring-rate spring 60 in the service housing 34 is significantly weaker than the high spring-rate spring 50 in the emergency housing 36. The push plate 54 is connected to a brake actuator rod 66 which passes through an opening 68 in the front wall of the service housing chamber 34. It will be readily understood by those skilled in the art that longitudinal movement of the brake actuator rod 66 "controls" the actual brakes of the wheels (not shown); forward movement applies them, and rearward movement, that is retraction, releases them.

Figure 2:
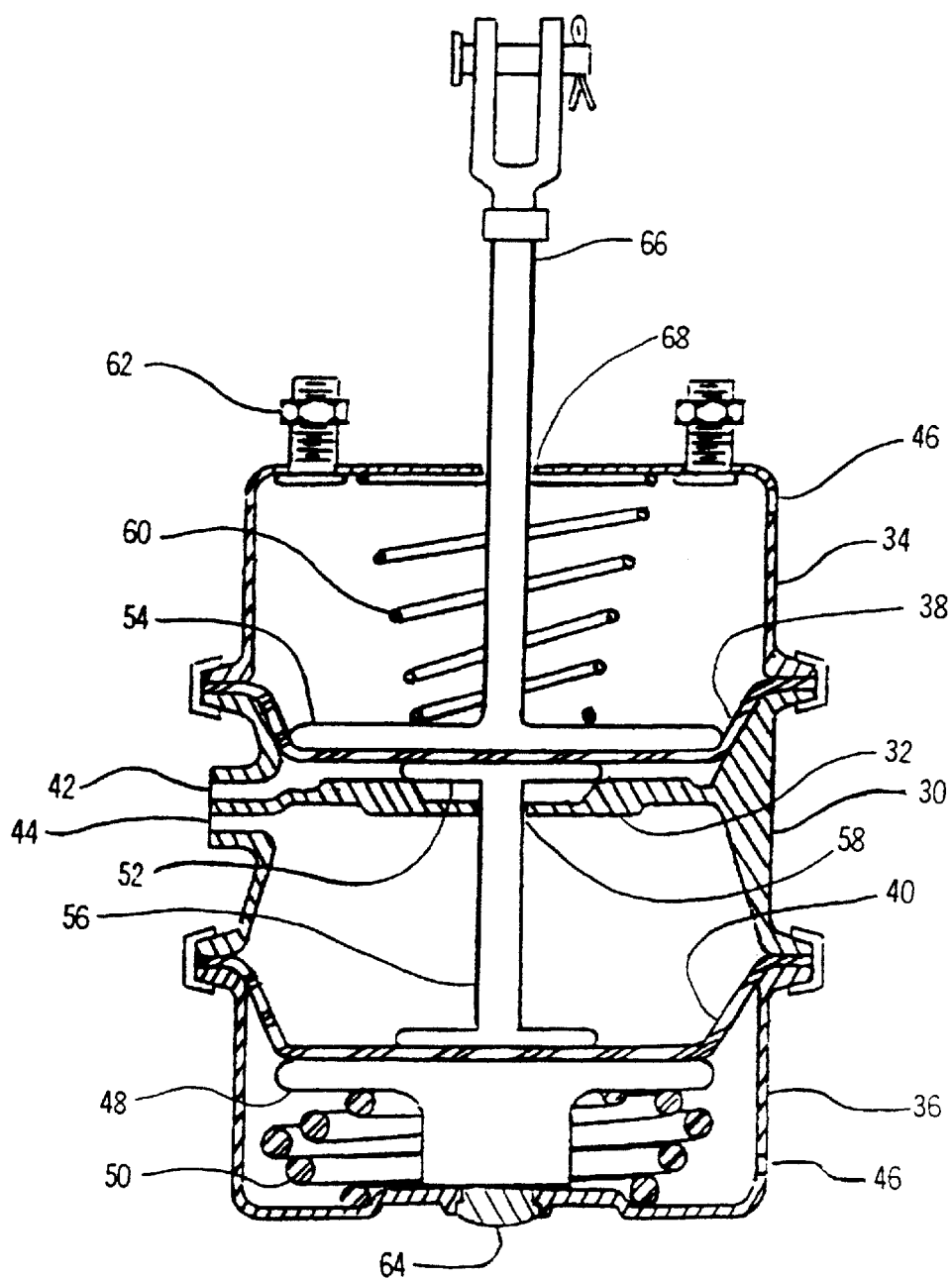
FIG. 2 is a sectional view of the dual chamber air brake system in accordance with the state-of-the-art, showing the air brakes in a situation when pressurized air is present in the system and the brakes are not deployed.
Figure 3:
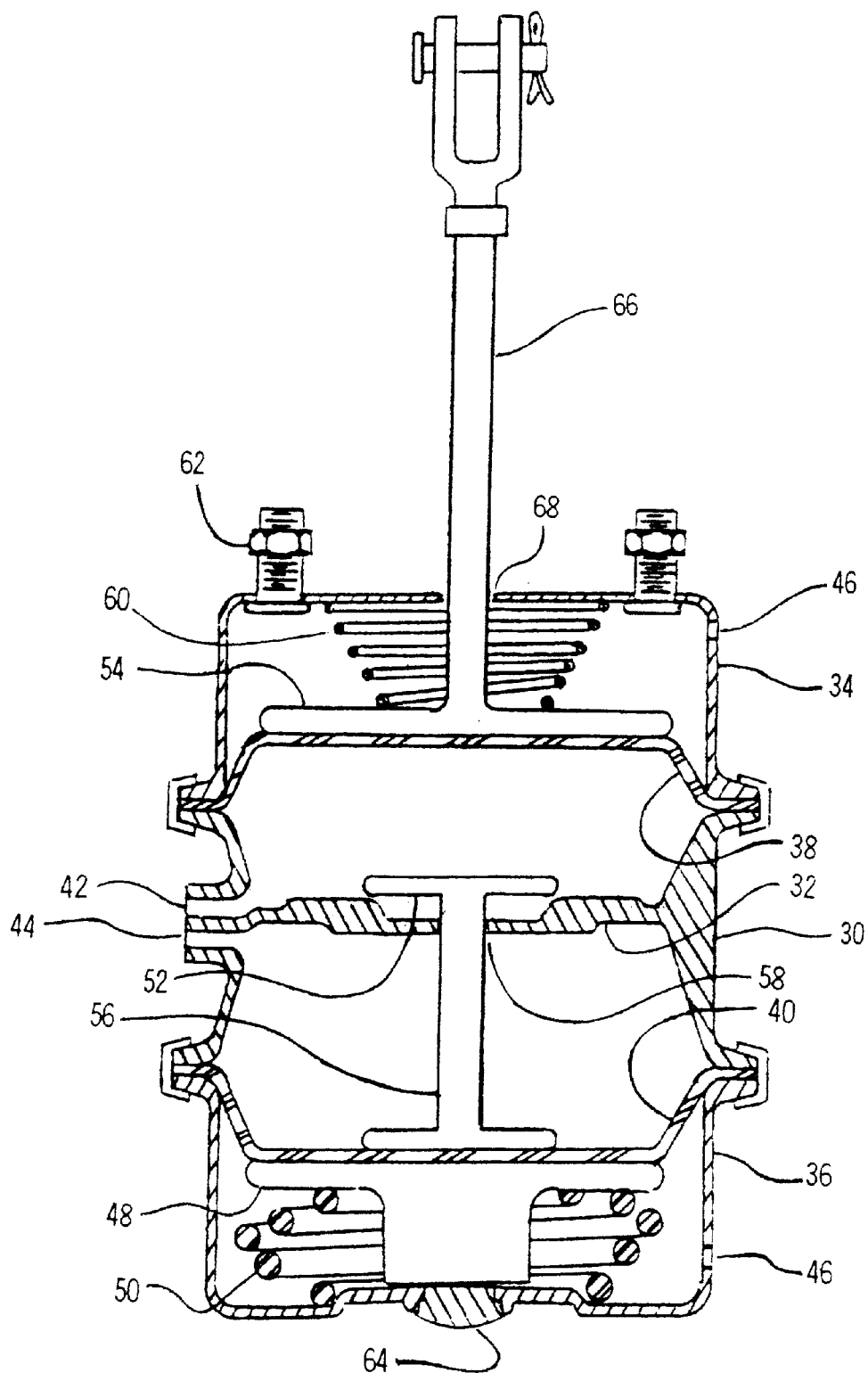
FIG. 3 is a sectional view of the dual chamber air brake system in accordance with the state-of-the-art, showing the air brakes in a situation when pressurized air is present in the system and the brakes are partially deployed.
Figure 4:
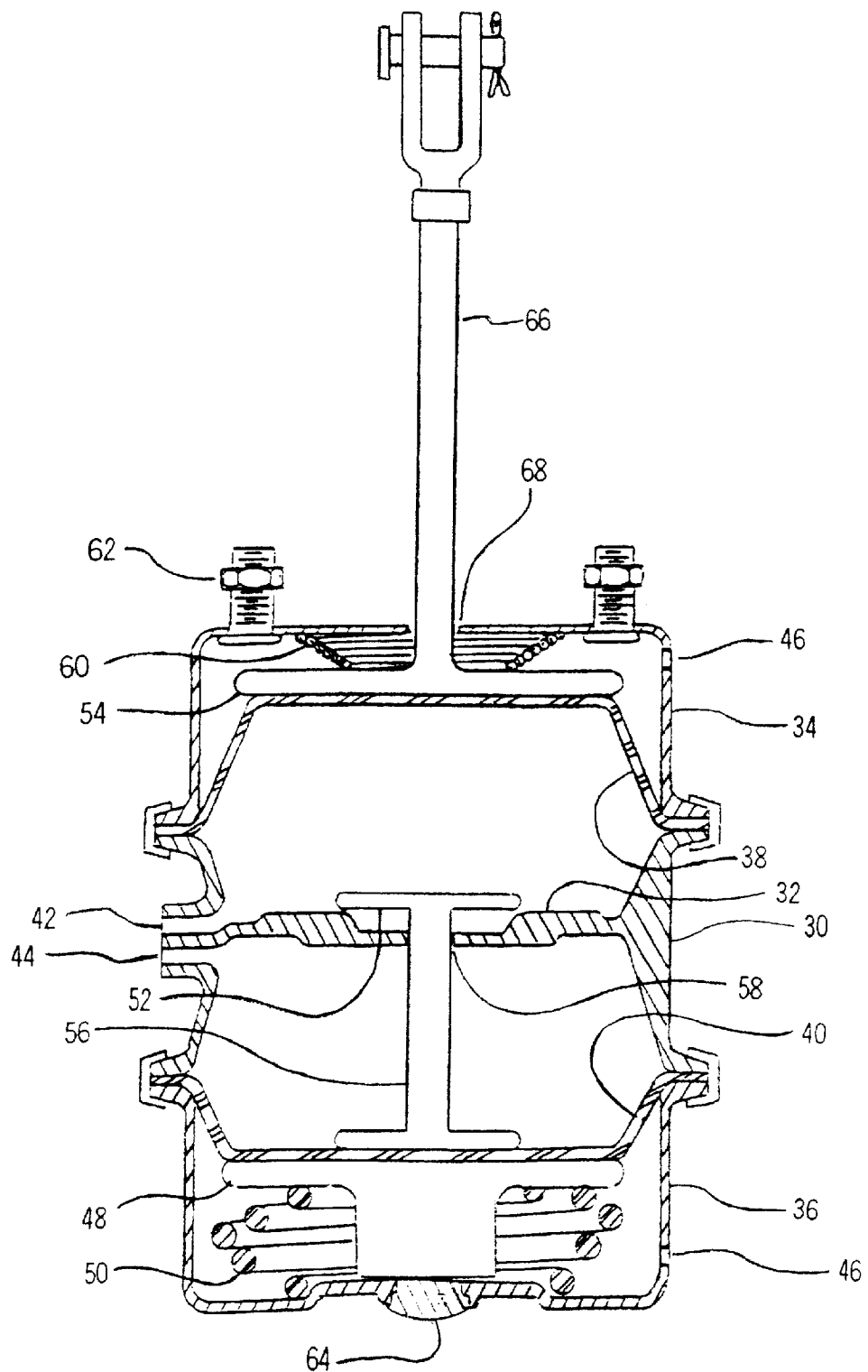
FIG. 4 is a sectional view of the dual chamber air brake system in accordance with the state-of-the-art, showing the air brakes in a situation when pressurized air is present in the system and the brakes are fully deployed.

FIG. 1 shows the state-of-the-art dual chamber brake system in a situation when compressed air is not provided to either chamber 34 or 36. This occurs usually when the trailer (not shown) truck (not shown) or other vehicle (not shown) is parked. In this situation the high spring-rate spring 50, overcoming the contrary force of the low spring rate spring 60 and compressing the same, pushes the guide 52 forward and thereby forces the push plate 54 and the brake actuator rod 66 forward, fully applying the actual wheel brakes (not shown). In such a situation the wheel brakes are locked and the trailer (not shown), tractor (not shown) or other vehicle (not shown) cannot be moved. However, when compressed air is supplied to the emergency chamber pressure port 44, as is shown in FIG. 2, then the spring 50 in the emergency housing chamber 36 is compressed and the low spring rate spring 60 causes the push plate 54 and the brake actuator rod 66 to retract thereby disengaging the wheel brakes (not shown). The trailer (not shown), tractor (not shown) or other vehicle (not shown) can now move normally. FIG. 3 shows the state-of-the-art dual chamber brake system with the brakes applied, as they would be when a driver (not shown) wishes to slow a moving vehicle (not shown). In this situation, due to application of the brake pedal (not shown) a measured pressure of compressed air is applied in the service housing chamber 34 through the service chamber pressure port 42, the service diaphragm 38 moves forward, the weak spring-rate spring 60 is partially compressed, the brake actuator rod 66 is pushed forward by the push plate 54, and the wheel brakes are applied. FIG. 4 shows the situation when the brakes are applied fully by applying full pressure of compressed air in the service housing chamber 34. However, it can be seen that compressed air is still supplied to the emergency housing chamber 36, and the high spring-rate spring 50 is still compressed; the brakes are applied but not "locked" as they would be when the trailer (not shown) is parked without a supply of compressed air to the brakes.

FIGS. 5 through 8 illustrate the first preferred embodiment of the anti-theft security device of the present invention, mounted into an otherwise state-of-the-art dual chamber brake system. In this connection it will become apparent and should be understood that the dual chamber brake system is modified to the extent necessary to accommodate and cooperate with the anti-theft, brake-locking security device or system. Moreover, while the present specification discloses generic principles and several preferred embodiments, several other hardware configurations can be built in light of the present disclosure to restrain the brakes in the locked condition, without departing from the spirit of the present invention. However, it is not desired to confine the invention to any of the exact forms shown in this specification, but rather to include them as broadly as is the scope of the invention.

In accordance with invention, and in the herein described first three preferred embodiments, an electro mechanical device, such as a servo motor, a solenoid or the like is employed to move one or more members or bodies which in the "locked" position mechanically block the retraction of the brake actuator rod 66, or push plate 54 from its "full brake" position, even if compressed air were supplied to the emergency housing chamber 36 and thereby the high spring-rate spring 50 were compressed and the guide 52 were to be retracted. The servo motor, solenoid or like electro mechanical actuating device utilized as a component in the apparatus of the present invention is responsive to a coded signal, such as an electromagnetic or infra red signal akin to the signal that is virtually ubiquitously used in modern times for opening and locking car doors and the like by remote control. The coded signal may be sent by a hand-held "remote control" transmitter, schematically shown in the drawings as 69, that is ideally possessed only by persons authorized to operate the trailer (not shown) truck (not shown) or other vehicle (not shown). Alternatively, the coded signal may be supplied to the servo motor, solenoid or like electro mechanical actuating device from a transmitter built into the cab of the towing vehicle (not shown). The signal may also be supplied through a wire connection rather than by radiation. Power to operate the servo motor, solenoid or like electro mechanical actuating device can be supplied by batteries in the trailer (not shown) truck (not shown) or other vehicle (not shown), or from batteries in the towing vehicle (not shown). In any event, the servo motors, solenoids or like electro mechanical actuating devices which are used as components of the apparatus of the present invention and which are responsive to a coded signal, are readily available in the state-of-the-art, and need not be described further.

Figure 5:
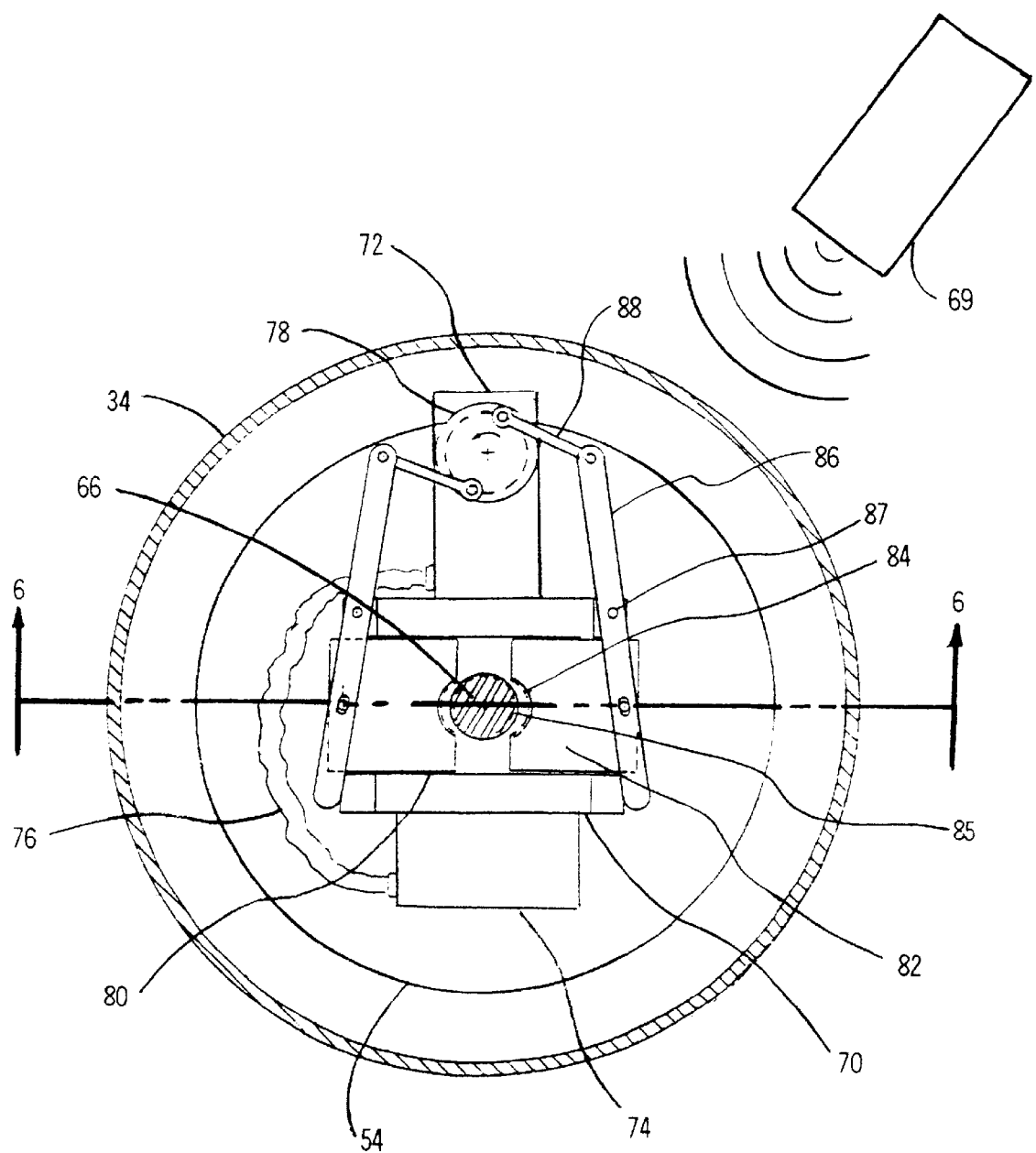
FIG. 5 is a cross-sectional transverse view of the service brake housing of the dual chamber brake system incorporating the first preferred embodiment of the security locking device of the present invention, showing the embodiment not activated, thus allowing the brakes to operate normally.
Figure 6:
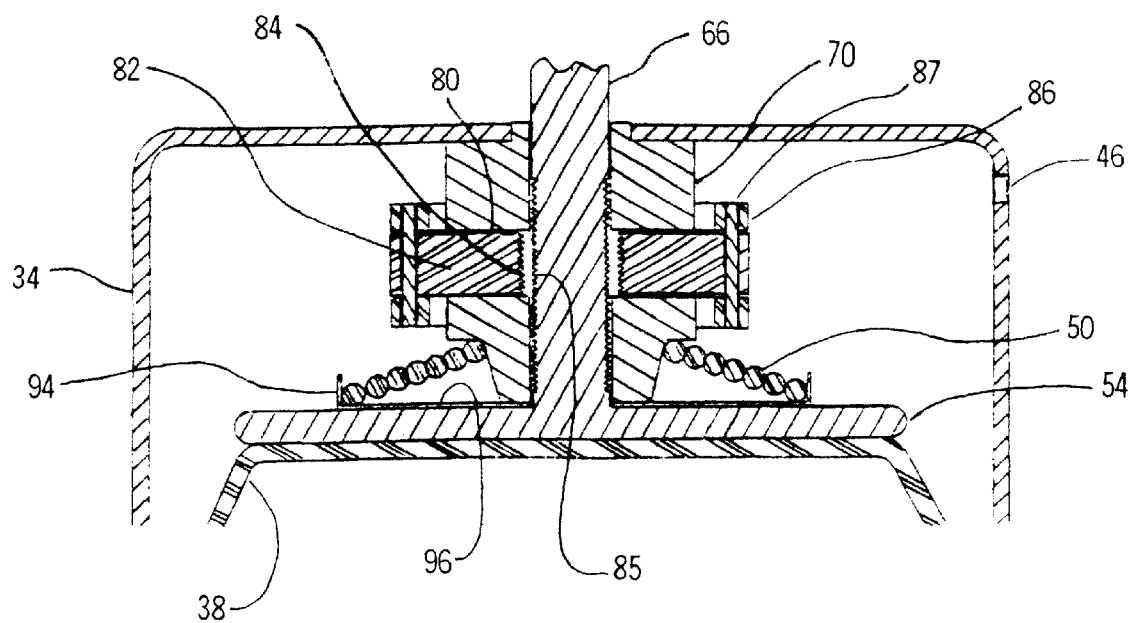
FIG. 6 is a partial cross-sectional view taken on lines 6,6 of FIG. 5.

In the first preferred embodiment the brake actuator rod 66 passes through a boss 70 which is affixed to the front wall of the service housing chamber 34. An end of the boss 70 which is remote from the front wall has a detent to accept the low spring-rate spring 50. A servo motor 72 is affixed to the one side of the boss 70, and a receiver decoder 74 is affixed to the other side of the boss 70. An electrical cable 76, shown in FIG. 5 connects the receiver decoder 74 to the servo motor 72. It will be readily understood by those skilled in the art that the servo motor 72 together with the receiver decoder 74 is responsive to a coded signal which can be transmitted by a hand-held remote 69 or from the cab of a truck (not shown), as described above. It will also be understood by those skilled in the art that the receiver-decoder may be placed within the same box or housing as the servo motor, so that there would be no separate housings for these two components. The output of the servo motor 72 is manifested in the limited reciprocal rotation of a disc 78 mounted to the motor's housing, as shown in FIG. 5. A radial opening 80 is located in the boss 70 and steel jaws 82 having teeth or serrations 84 are mounted for in-and-out sliding motion in the radial direction within the opening 80. The circumferential area of the brake actuator rod 66 which interfaces with the jaws 82 is provided with teeth or serrations 84 to interface and mesh with the teeth 85 of the jaws 82. In and out movement of the jaws 82 in the radial direction is controlled by levers 86 which are pivotably attached on fulcrum points 87 to the jaws 82 and to smaller levers 88 radially and pivotably mounted to the output disc 78 of the servo motor 72. FIGS. 5 and 6 show the output disc 78 in a position where the levers 86 and 88 cause the jaws 82 to disengage from the teeth or serrations 84 of the brake actuator rod 66. This is the position of the jaws 82 in the situation where the brakes of the trailer are in normal operation, that is when the trailer (not shown) is being towed, or stopped but compressed air is being supplied to the dual chamber brake system.

Figure 7:
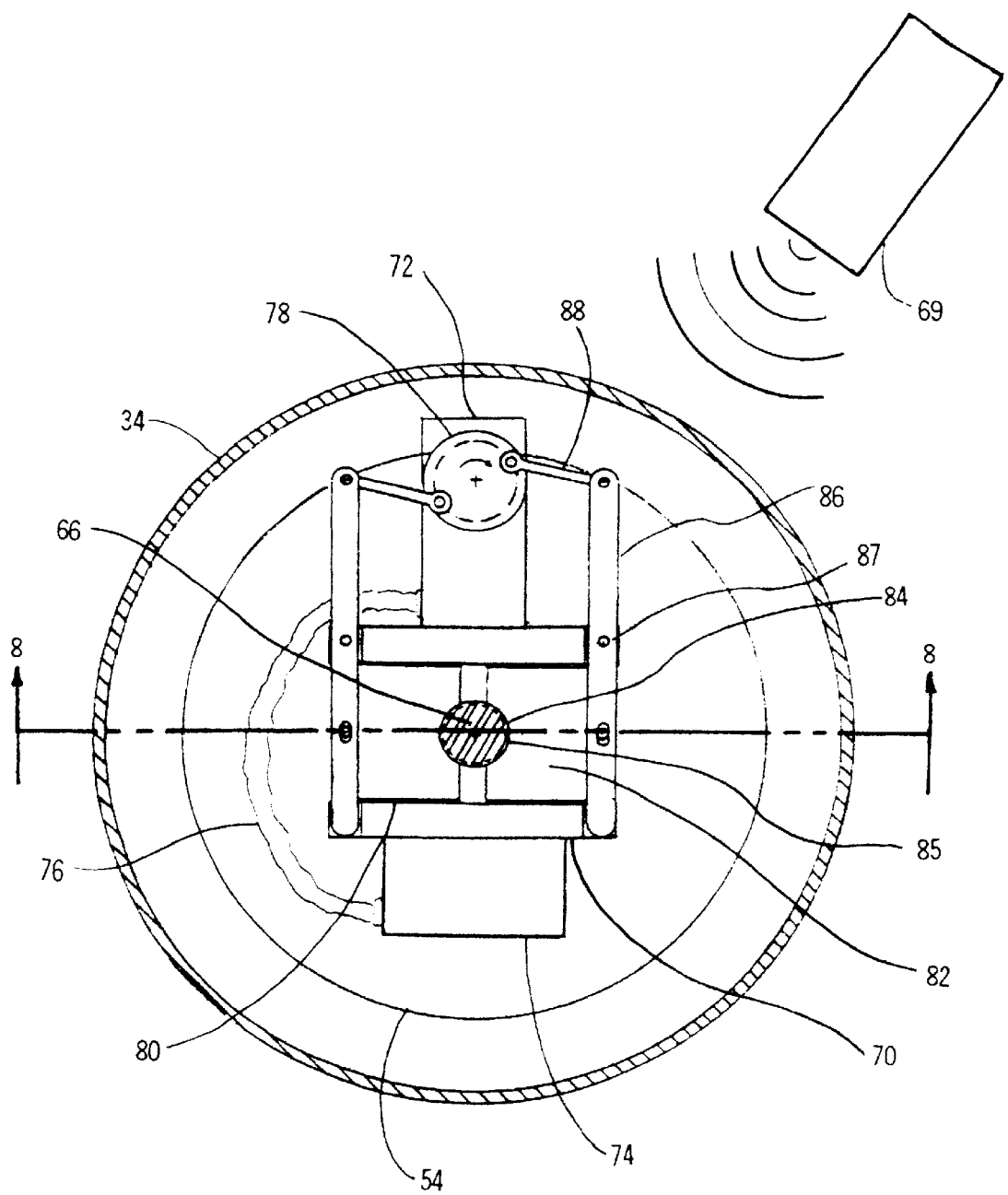
FIG. 7 is a cross-sectional transverse view of the service brake housing of the dual chamber brake system incorporating the first preferred embodiment of the security locking device of the present invention, showing the embodiment activated, thus keeping the brakes in a locked position.
Figure 8:
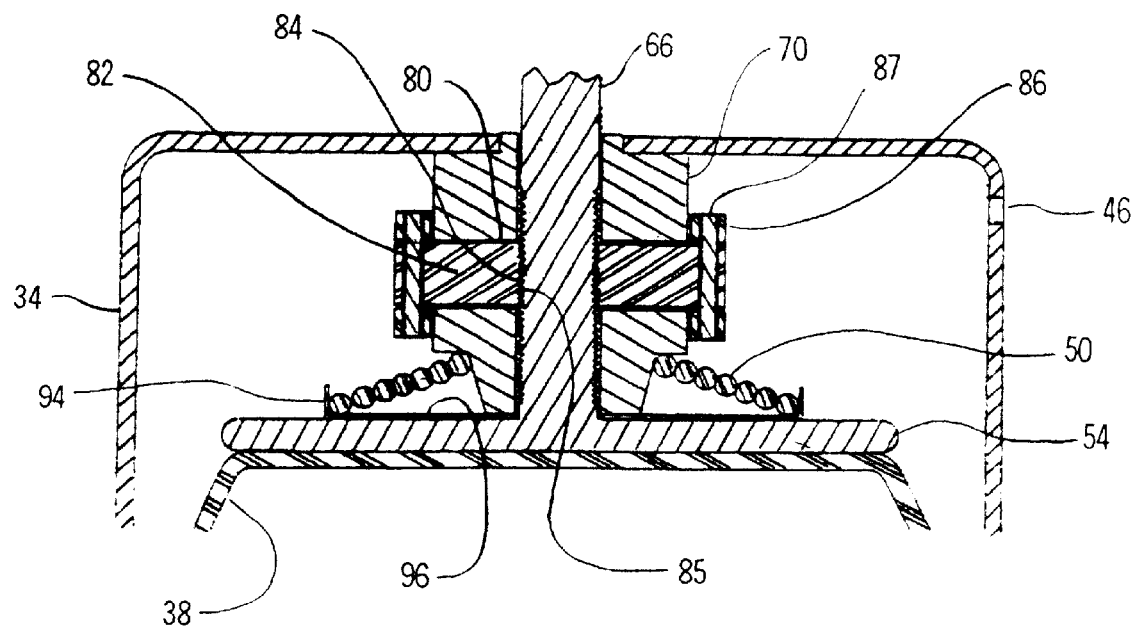
FIG. 8 is a partial cross-sectional view taken on lines 8,8 of FIG. 7.

When it is desired to park and secure against theft the trailer (not shown) or other equipment or vehicle that incorporates the dual chamber brake system security device of the present invention, then the servo motor 72 is activated with an appropriate secret coded signal. As a result, the output disc 78 turns in the clockwise direction, as is shown in FIG. 7, and levers 86 and 88 cause the serrated jaws 82 to seize the serrations 84 of the brake actuator rod 66, as shown in FIG. 8. In this situation the brake system is locked because the brake actuator rod 66 cannot be retracted to release the wheel brakes (not shown) even if compressed air were to be supplied to the emergency housing chamber 36. The situation can be reversed however, and the brake system unlocked, by providing a coded signal to the receiver decoder 74 causing the servo motor 72 to turn the disc 78 in the counterclockwise direction to unlock the jaws 82 from the brake actuator rod 66.

Figure 9:
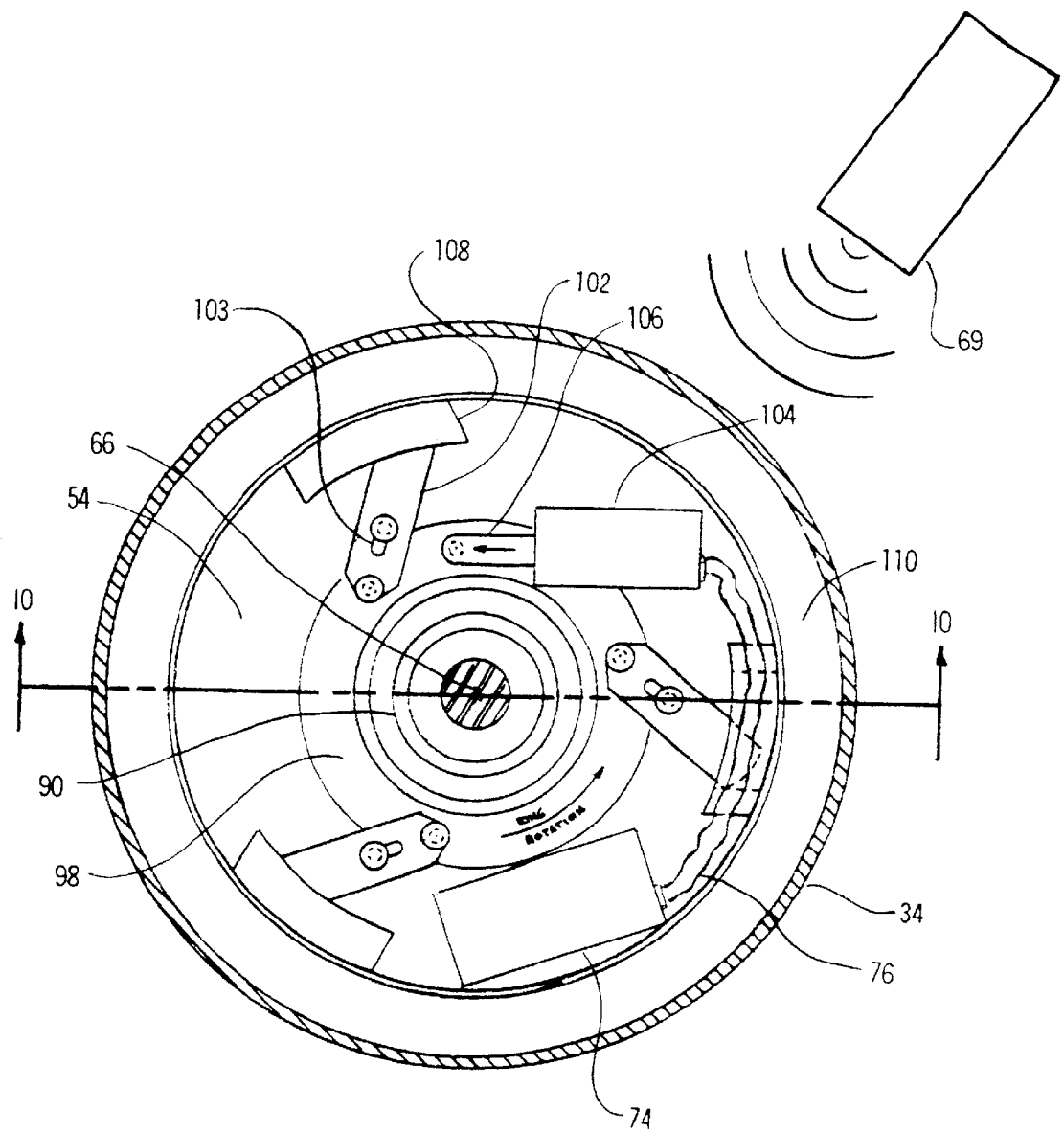
FIG. 9 is a cross-sectional transverse view of the service brake housing of the dual chamber brake system incorporating the second preferred embodiment of the security locking device of the present invention, showing the embodiment not activated, thus allowing the brakes to operate normally.
Figure 10:
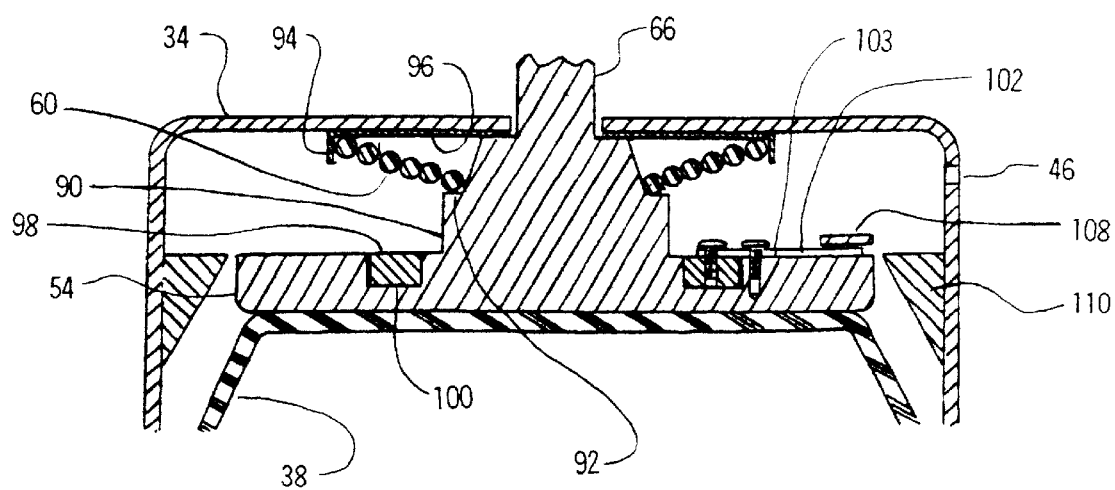
FIG. 10 is a partial cross-sectional view taken on lines 10,10 of FIG. 9.
Figure 11:
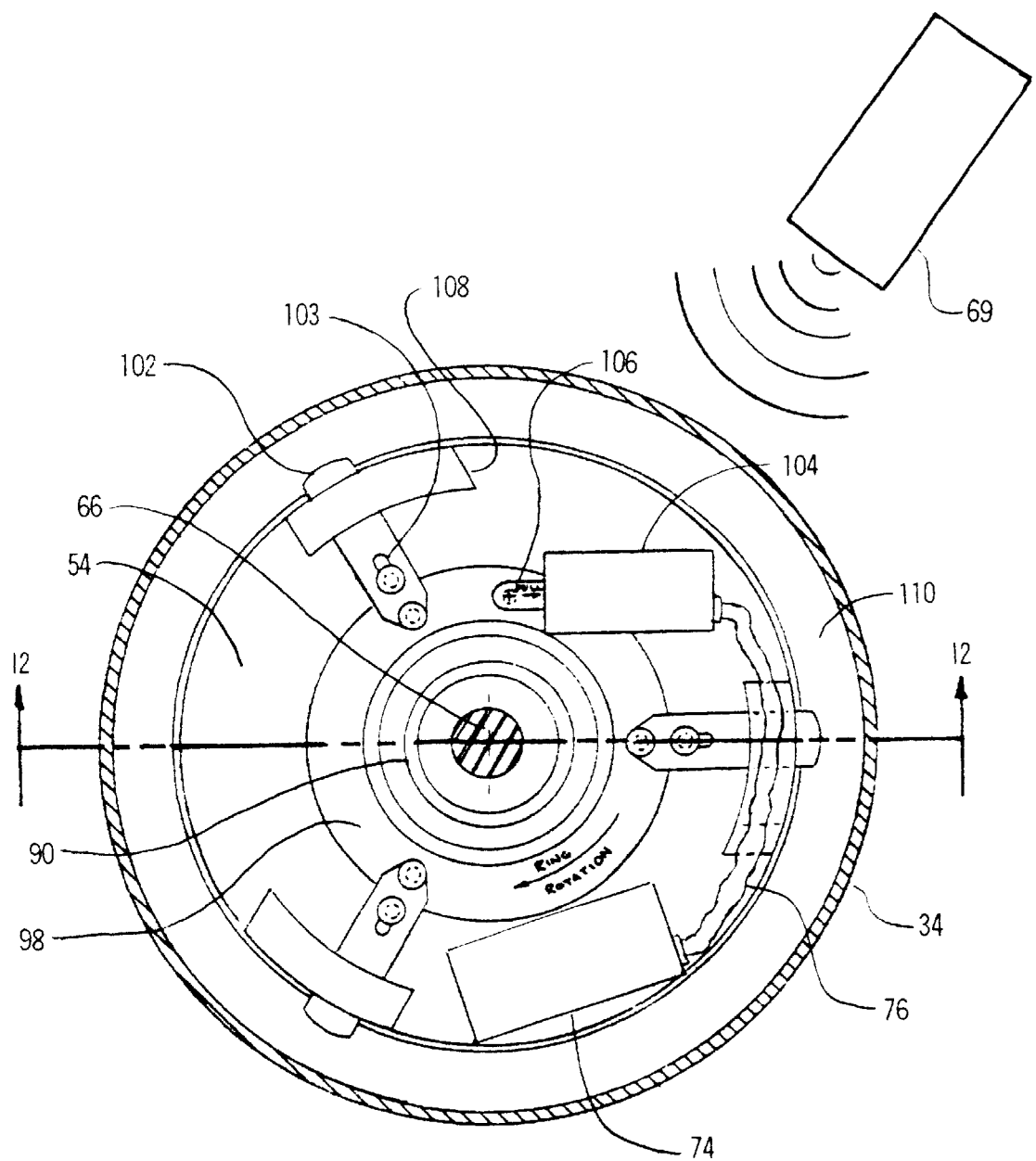
FIG. 11 is a cross-sectional transverse view of the service brake housing of the dual chamber brake system incorporating the second preferred embodiment of the security locking device of the present invention, showing the embodiment activated thus keeping the brakes in a locked position.
Figure 12:
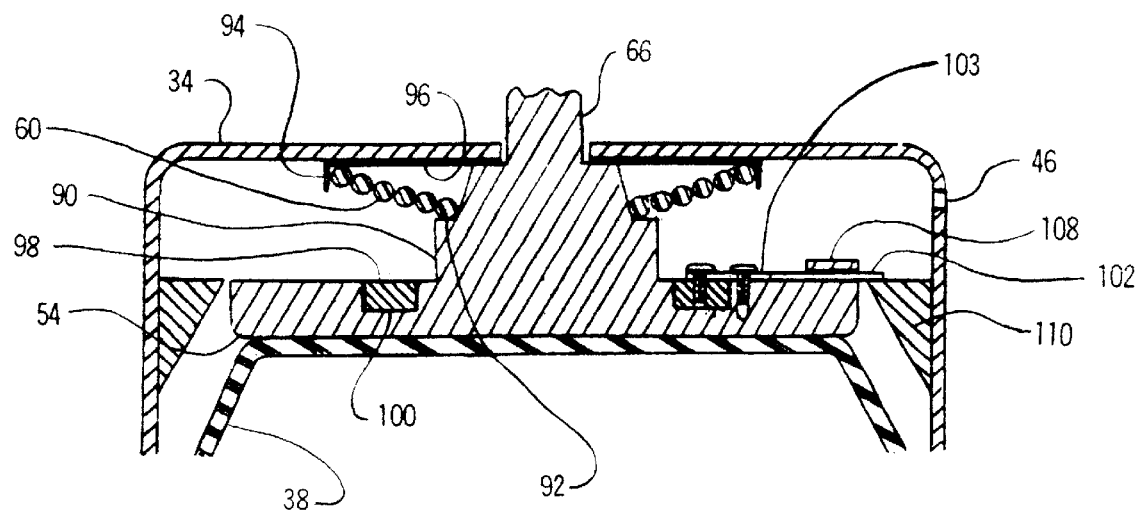
FIG. 12 is a partial cross-sectional view taken on lines 12,12 of FIG. 11.

FIGS. 9 through 12 show a second preferred embodiment of the dual chamber brake system security device of the present invention. In this embodiment a boss 90 is constructed integrally, or is affixed to the brake actuator rod 66. The boss 90 includes a shoulder 92 to accept the low spring-rate spring 60. Another end of the spring 60 is retained by the lip 94 of a plate 96 that abuts the front wall of the service chamber housing 34. The boss 90 is integrally constructed with, or is affixed to the push plate 54, which has a ring 98 disposed in an annular groove 100. The ring 98 is capable of limited rotary motion within the groove 100. A plurality of tabs or levers 102 are pivotably attached to the ring 98, and also to the surface of the push plate 54 where they are free for limited motion in guides 103. A solenoid 104 and a receiver decoder 74 are mounted to the push plate 54. The solenoid 104 and the receiver decoder 74 are connected by an electrical cable 76. As in the first preferred embodiment the solenoid 104 and the receiver decoder 74 may be mounted in a common housing. An output shaft 106 of the solenoid 104 is attached to the ring 98 in a manner such that the in-and-out motion of the output shaft 106 rotates the ring 98 thereby causing the levers 102 to protrude or retract relative to the edge of the push plate 54. The levers 102 are retained within the push plate 54 against any axial motion by retainer plates 108 which are themselves affixed to the push plate 54. A shelf ring 110 is fixedly attached (by welding or otherwise) to the wall of the service chamber housing 34 in a location such that when the levers 102 protrude beyond the edge of the push plate 54, they rest on or are in close proximity above the surface of the fixed shelf ring 110. The solenoid 104 and the receiver decoder 74 are responsive to a coded signal, as described above. FIGS. 9 and 10 illustrate the second preferred embodiment in a situation where the ring is positioned by the solenoid output shaft 106 such that levers 102 are retracted, and are not disposed on, or above the fixed shelf ring 110. This is the situation wherein the brake system operates normally. When it is desired to park the vehicle (not shown), to disconnect the supply of compressed air and to secure the vehicle (not shown) against unauthorized taking, then the appropriate coded signal is sent to the solenoid/receiver decoder system thereby causing the solenoid output shaft 106 to move the ring 98, extend the levers 102 so that they engage the fixed shelf ring 110. This situation is shown in FIGS. 11 and 12. It should be apparent from the foregoing description that in the latter position of the levers 102, the push plate 54 and the brake actuator rod 66 cannot be retracted even if compressed air were to be supplied to the emergency housing chamber 36. Therefore, the trailer or other vehicle is secured against unauthorized taking. The brake system can be freed again for normal operation by sending the appropriate coded signal to the solenoid/receiver decoder system, thereby causing the levers 102 to retract from their engagement with the fixed shelf ring 110.

Figure 13:
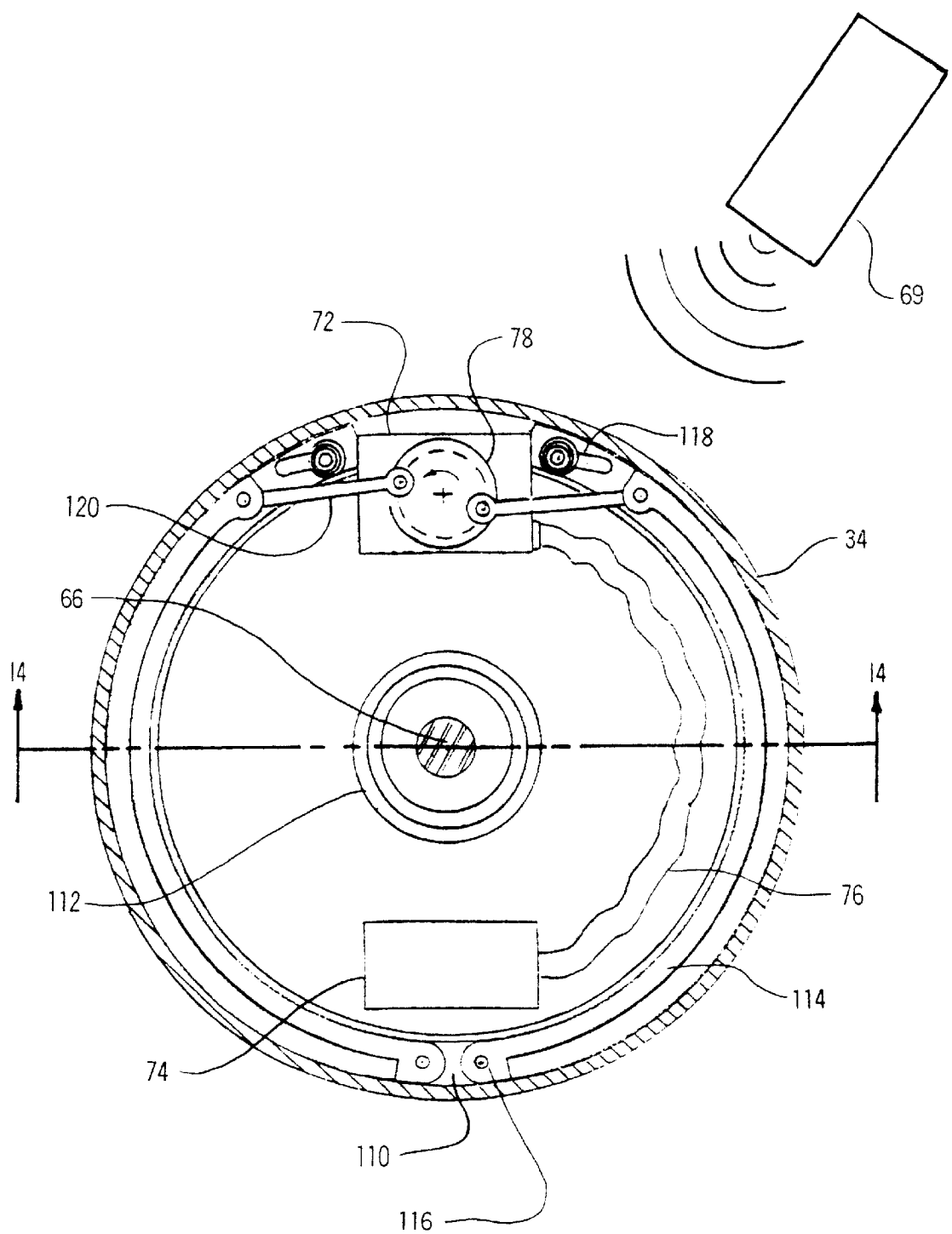
FIG. 13 is a cross-sectional transverse view of the service brake housing of the dual chamber brake system incorporating the third preferred embodiment of the security locking device of the present invention, showing the embodiment not activated thus allowing the brakes to operate normally.
Figure 14:
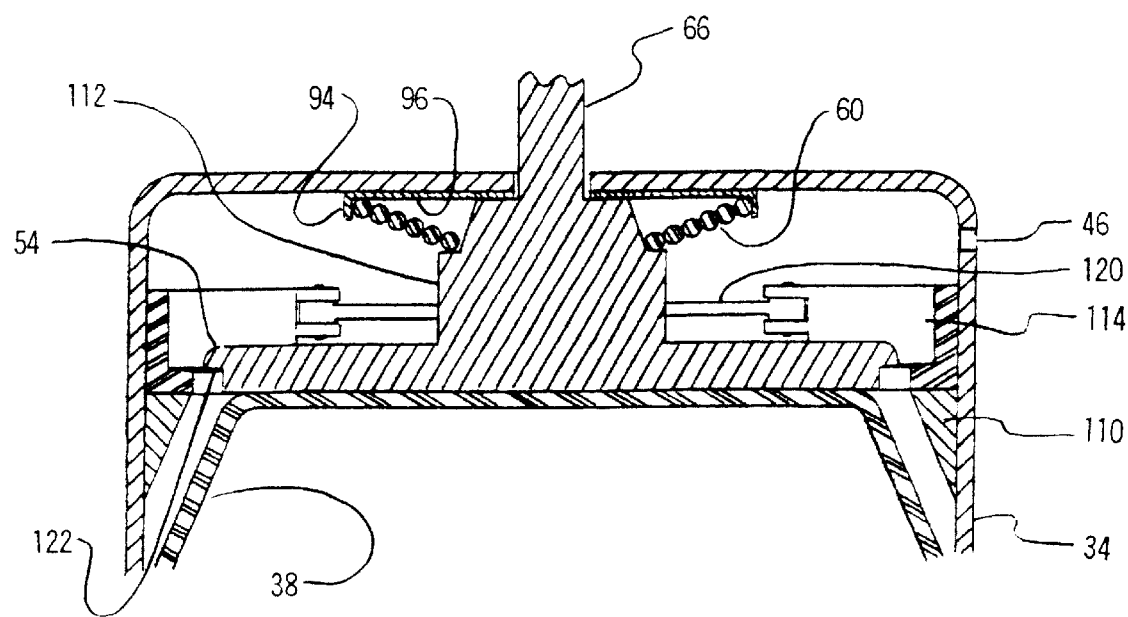
Figure 15:
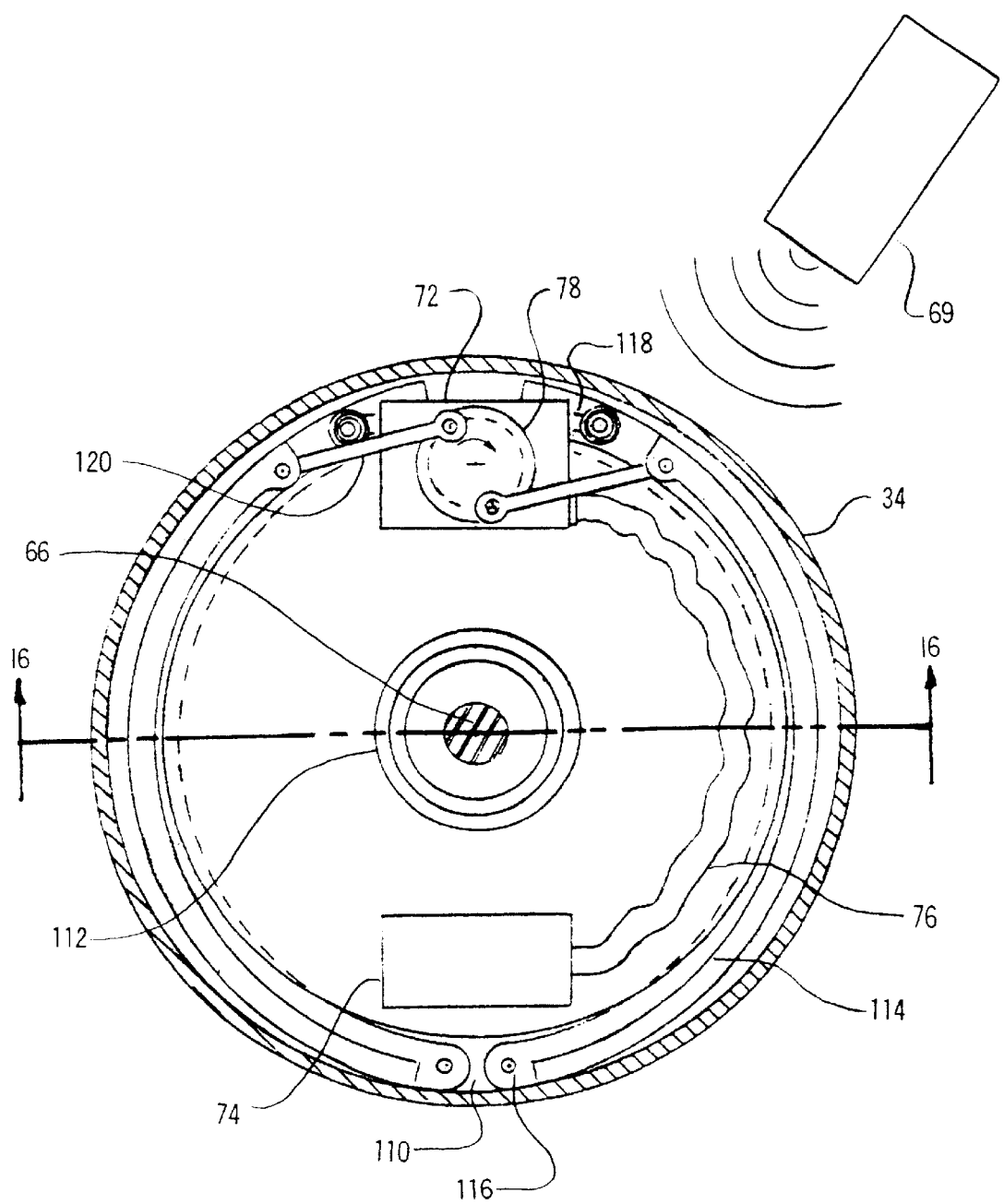
FIG. 15 is a cross-sectional transverse view of the service brake housing of the dual chamber brake system incorporating the third preferred embodiment of the security locking device of the present invention, showing the embodiment activated thus keeping the brakes in a locked position.
Figure 16:
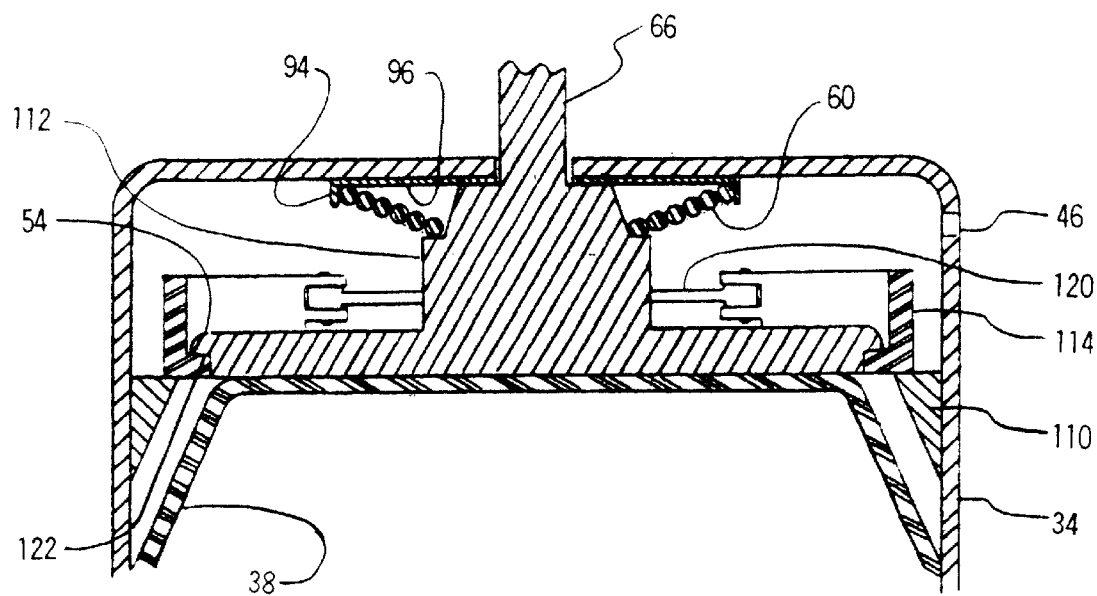
FIG. 16 is a partial cross-sectional view taken on lines 16,16 of FIG. 15.

FIGS. 13 through 16 illustrate a third preferred embodiment of the dual chamber brake system security device of the present invention. In this embodiment a boss 112 is constructed integrally with or affixed to the brake actuator rod 66 and to the push plate 54 and retains the weak spring-rate spring 60 in substantially the same manner as in the second preferred embodiment. A shelf ring 110 is affixed to the interior wall of the of the service chamber housing 34. A servo motor 72 and receiver decoder 74 are mounted to the fixed shelf ring 110. A pair of caliper arms 114 are also mounted to the shelf ring 110 on pivot or fulcrum points 116 and on retainer guides 118. The caliper arms 114 are connected to the output disc 78 of the servo motor 72 through levers 120. The underside of the push plate 54 has a shoulder or detente 122. As is shown in FIGS. 13 and 14, during normal operation of the brake system the caliper arms 114 are disposed above the fixed shelf ring 110, and do not interfere with the up-and-down or axial motion, that is with the normal operation of the push plate 54 and of the brake actuator rod 66. When it is desired to park the vehicle (not shown), to disconnect the supply of compressed air and to secure the vehicle (not shown) against unauthorized taking, then a coded signal is sent to the servo motor/receiver decoder system thereby causing the servo motor output disc 78 to move the levers 120 thereby retracting the calipers 114 underneath the shoulder 122 of the push plate 54 so that the calipers 114 are disposed in engagement with both the shelf ring 110 and the push plate 54, as shown in FIGS. 15 and 16. Consequently, the push plate 54 and the brake actuator rod 66 could not move downwardly even if compressed air were to be supplied to the emergency housing chamber 36. The situation can be reversed and the brake system allowed to operate normally, by reversing the rotation of the output disc 78 of the servo motor 72 as a result of an appropriate coded signal sent by an authorized user (not shown).

The above described three preferred embodiments represent aspects of the invention wherein electro mechanical means are utilized within the interior of the dual chamber brake system housing to mechanically block the retraction of the brake actuator rod 66 in order to secure the trailer (not shown) or other vehicle or equipment (not shown) against unauthorized taking. It should be apparent to those skilled in the art that numerous electro mechanical means can be found which are equivalent to those disclosed in these preferred embodiments and that therefore various hardware configurations may be constructed in light of the foregoing disclosure and within the scope of the invention.

Figure 17:
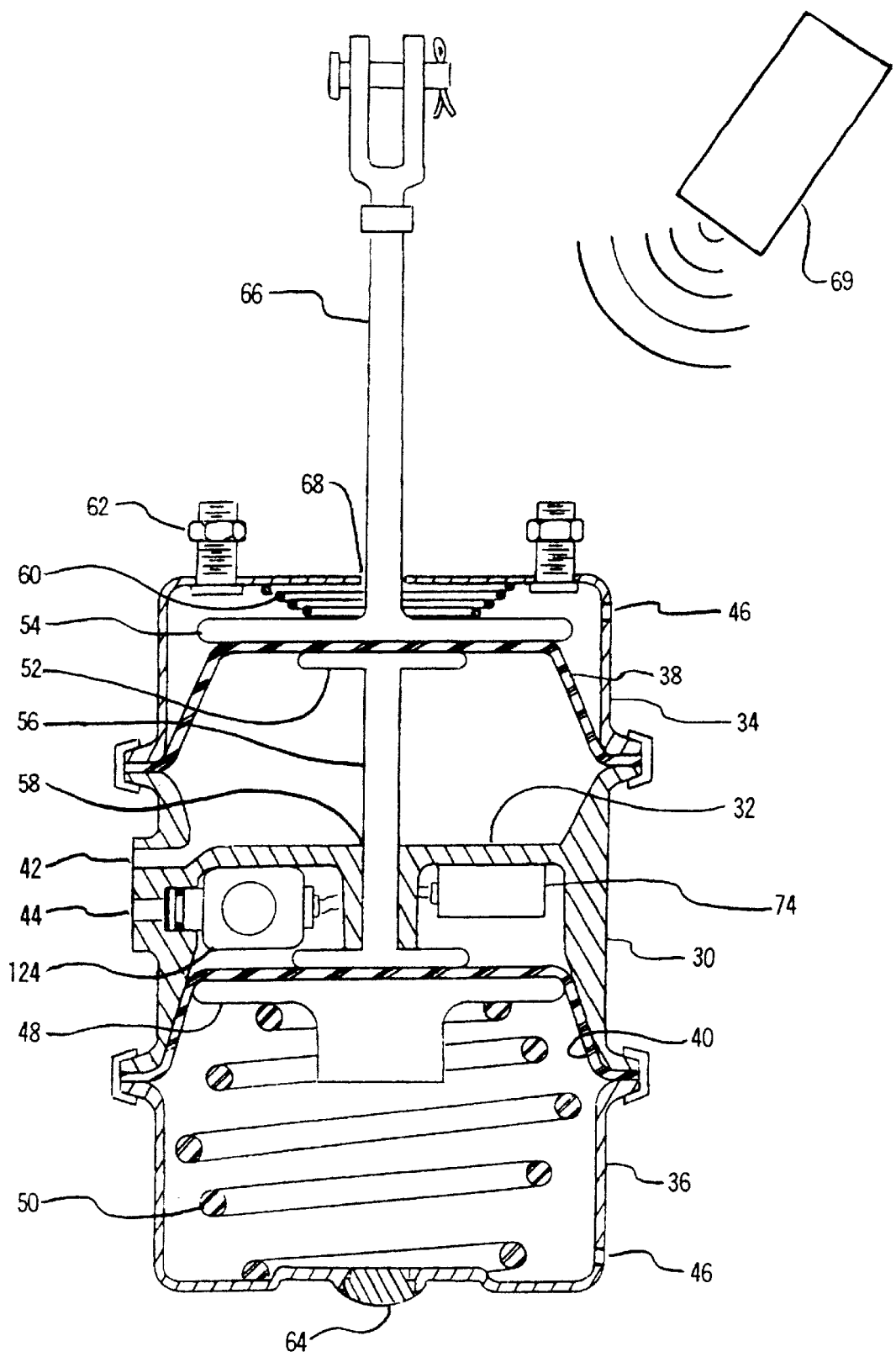
FIG. 17 is a cross-sectional view of the service brake housing of the dual chamber brake system incorporating the fourth preferred embodiment of the security locking device of the present invention.

FIG. 17 discloses a fourth preferred embodiment of the dual chamber brake system security device of the present invention. In this embodiment a valve 124 is incorporated within the interior of the emergency housing chamber 36 to block, when desired, the supply of compressed air through the emergency chamber pressure port 44. The valve 124 is controlled by an electro mechanical device, such as a solenoid that opens and closes the valve responsive to coded signals sent by an authorized user, substantially as described above. For normal operation of the brake system the valve 124 is open. It is closed, as result of a coded signal, only when it is desired to park and secure the trailer (not shown), vehicle (not shown) or other equipment (not shown), thereby preventing the high spring-rate spring 50 from being compressed to release the brakes (not shown).

It should be readily apparent from the foregoing that the security device of the present invention is a significant preventive measure and deterrent against unauthorized taking (stealing) of a trailer, vehicle or other equipment equipped with the device. Inactivation of the device requires the ability to send the appropriate coded signal, which is, generally speaking, not available to a would-be thief. Alternatively, the device could be inactivated or rendered inoperative only by first dismantling the dual chamber brake system housing, which is an arduous and time-consuming task, and for a thief or intruder greatly increases the risk of apprehension.

What is claimed is:

1. Apparatus for locking and unlocking the brake actuator of a dual chamber brake system that operates with compressed air, wherein the dual chamber includes a brake actuator in a first chamber and a high spring-rate spring in a second chamber, the brake actuator being movable in the axial direction to apply and release the brakes of the brake system; in the absence of compressed air the high spring-rate spring expanding to bias and keep the brake actuator in an axially forward position locking the brakes of the brake system, and wherein when there is compressed air in the second chamber the high spring-rate spring is compressed and allows retraction of the brake actuator from its forward position to unlock the brakes, the apparatus comprising:

electro mechanical means responsive to a first coded signal for locking the brake actuator into the forward position preventing its movement axially, whereby the brakes are locked independently of the status of expansion or compression of the high spring-rate spring, the electro mechanical means being responsive to a second coded signal for unlocking the brake actuator thereby unlocking the brakes, said electro mechanical means being mounted within the first chamber of the dual chamber brake system, and said electro mechanical means including a servo motor operatively associated with a receiver decoder for receiving said coded signals, the servo motor having a first rotary position in one of clockwise and counterclockwise direction responsive to the first coded signal and a second rotary position in the opposite direction responsive to the second coded signal, locking means for mechanically preventing axial movement of the brake actuator away from its locked forward position in the first rotary position of the servo motor and for freeing the brake actuator for axial movement in the second rotary position of the servo motor, and connecting means for operatively connecting the servo motor with the locking means, and said brake actuator having a serrated portion, the locking means including a pair of members having serrated portions, and wherein in the first rotary position of the servo motor the serrated portions of the members engage the serrated portion of the brake actuator.

2. A dual chamber brake system that operates with compressed air, the brake system including a brake actuator in a first chamber and a high spring-rate spring in a second chamber, the brake actuator being movable in the axial direction to apply and release the brakes of the brake system; in the absence of compressed air the high spring-rate spring expanding to bias and keep the brake actuator in an axially forward position locking the brakes of the brake system, the high spring-rate spring being compressed and allowing retraction of the brake actuator from its forward position so as to unlock the brakes when there is compressed air in the second chamber, the apparatus further comprising:

electro mechanical means responsive to a first coded signal for locking the brake actuator into the forward position preventing its movement axially, whereby the brakes are locked independently of the status of expansion or compression of the high spring-rate spring, the electro mechanical means being responsive to a second coded signal for unlocking the brake actuator thereby unlocking the brakes, said electro mechanical means being mounted within the first chamber of the dual chamber brake system, and said electro mechanical means including a servo motor operatively associated with a receiver decoder for receiving said coded signals, the servo motor having a first rotary position in one of clockwise and counterclockwise direction responsive to the first coded signal and a second rotary position in the opposite direction responsive to the second coded signal, locking means for mechanically preventing axial movement of the brake actuator away from its locked forward position in the first rotary position of the servo motor and for freeing the brake actuator for axial movement in the second rotary position of the servo motor, and connecting means for operatively connecting the servo motor with the locking means, and said brake actuator having a serrated portion, the locking means including a pair of members having serrated portions, and wherein in the first rotary position of the servo motor the serrated portions of the members engage the serrated portion of the brake actuator.

* * * * *